Patented Dec. 9, 1952

2,621,188

UNITED STATES PATENT OFFICE 2,621,188

PROCESS FOR PREPARING THIOPHENE HOMOLOGS

Kenneth L. Kreuz, Beacon, N. Y., assignor to The Texas Company, New York, N. Y., a corporation of Delaware No Drawing. Application November 13, 1951, Serial No. 256,157

16 Claims. (Cl. 260—329)

This invention relates to an improved process for the preparation of heterocyclic sulfur compounds and particularly to an improved process for the production of thiophene and its homologs.

Heterocyclic sulfur compounds such as those containing a thiophene nucleus have in the past been primarily of academic interest due to the uneconomical and difficult methods used in the preparation thereof. Recent developments, however, have shown that thiophene and its homologs may be synthesized by methods which involve the use of economical charge stocks and which are easily adaptable to commercial operation. These two commercially feasible methods comprise the catalytic reaction of sulfur dioxide with aliphatic hydrocarbons and the catalytic reaction of hydrogen sulfide with aliphatic hydrocarbons. These reactions are conducted in the vapor phase and in the presence of a surface-active type of catalyst.

The process of the subject invention provides means for directly preparing thiophene, alkyl-, alkenyl-, aryl- and aralkyl-substituted thiophenes. The invention is particularly useful in preparing small batch amounts of specific aliphatic- or aryl-substituted thiophene compounds. The discovery of a process whereby either small or large amounts of thiophene and selected aliphatic- or aryl-substituted thiophene compounds are prepared in a useful supplement to the above-described processes which are mainly applicable to large volume production.

In accordance with the process of the invention, thiophene, aliphatic- and aryl-substituted thiophene compounds are prepared by pyrolyzing in the vapor phase a trithiane compound in which at least two of the nuclear carbon atoms contain an aliphatic substituent. The term, aliphatic substituent, as employed in the process of this invention includes alkyl, alkenyl and aralkyl groups. Ordinarily, tri- or hexa-aliphatic trithianes are employed as the charge material in the pyrolysis reaction of the invention. The pyrolysis is effected at a temperature of 500 to 1500° F., and preferably in the presence of a catalyst. However good yields of thiophenes, arylthiophenes, alkyl- and alkenyl-substituted thiophenes are prepared from aliphatic trithianes by non-catalytic pyrolysis. Atmospheric pressure is usually employed in the pyrolytic conversion of the invention.

Trithiane is a heterocyclic compound containing three carbon atoms and three sulfur atoms in alternate positions in the nucleus. Trithiane, itself, has the following structural formula:

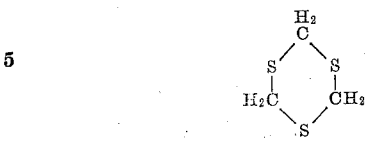

and is prepared by acid-catalyzed condensation of hydrogen sulfide and formaldehyde. Aliphatic-substituted trithianes are prepared either by acid-catalyzed condensation of hydrogen sulfide with aldehydes and ketones or by alkylation of trithiane.

In the trithiane compounds which form the charge material to the process of this invention at least two of the nuclear carbon atoms contain an aliphatic group. The substituted trithianes which may be employed in the process of the invention have the general formula:

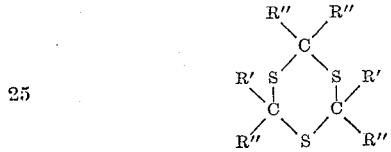

wherein the R's designate an alkyl, an alkenyl of an aralkyl group which may be similar or different in nature and the R" designate a hydrogen, an alkyl group, an alkenyl or aralkyl group. The charge compounds of the process of the invention are prepared by condensation of hydrogen sulfide with aldehydes higher than formaldehyde and with ketones or by alkylation of trithiane or an alkyl derivative thereof. Condensation of hydrogen sulfide with aldehydes higher than formaldehyde produces tri-aliphatic substituted trithianes. Condensation with ketones yields hexa-aliphatic substituted trithianes.

Pyrolysis of a trithiane compound of prescribed composition yields a thiophene nucleus by utilization of a carbon atom from two of the trithiane aliphatic substituents. As a consequence alkyl side chains of thiophenes produced in this invention are one carbon atom shorter than the alkyl groups present on the charge trithianes.

The process of the invention is illustrated by the conversion of various trithiane derivatives to thiophene compounds. Although it is only necessary for the charge trithiane compound to have two of the nuclear carbon atoms substituted with an aliphatic group, the invention is usually illustrated by the conversion of tri- or hexa-aliphatic trithianes since they are simply formed by condensation of hydrogen sulfide with aldehydes or ketones. Pyrolysis of trimethyltrithiane results in the production of thiophene, whereas the pyrolysis of triethyltrithiane produces dimethyl thiophene. Further examples of the pyrolytic reaction of this invention are the conversion of tribenzyltrithiane to diphenylthiophene, of hexamethyltrithiane to dimethylthiophene, of hexaethyltrithiane to dimethyl-diethylthiophene and of tripropenyltrithiane to divinylthiophene. These examples illustrate that the aliphatic group substituted on at least two of the carbon atoms of the trithiane nucleus can be either alkyl, alkenyl or aralkyl and that a carbon atom from two of the trithiane aliphatic groups enters into formation of the thiophene nucleus.

As has been indicated previously, the pyrolysis reaction of this invention for production of thiophene, alkyl-, alkenyl-, aryl-, and aralkyl-substituted thiophene compounds does not require the presence of the solid contact material in order to obtain a substantial yield of the desired product. For example, a mixture of dialkylthiophenes, specifically, a mixture of 2,4- and, 2,5-dimethylthiophenes, is obtained by the non-catalytic pyrolysis of hexamethyltrithiane at a temperature of about 1100° F. It is advantageous, however, in order to obtain the optimum yields of aliphatic-substituted thiophene compounds to effect the pyrolysis in a reaction zone containing a catalytic material.

Accordingly, the heterocyclization reaction of the invention is preferably conducted in the presence of a solid contact catalyst which may be described chemically as a solid contact material of the class consisting of oxides and sulfides which are stable under reaction conditions. Such catalysts include metal oxides such as molybdena which, under the conditions of reaction may undergo conversion to the corresponding sulfide. It is recognized that certain of the materials classified as catalytic for the subject reaction are inert as applied to conventional reactions. Catalysts are the solid acid-reacting materials such as amphoteric metal oxide and sulfides which are stable under reaction conditions such as alumina, silica, etc.

Specific examples of catalysts which may be used in the pyrolysis are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and represents preferred catalysts for the process of this invention. Suitable dehydrogenation catalysts are the oxides and stable sulfides of the metals of group VI of the periodic table on a surface-active supporting material such as silica and alumina. Specially preferred dehydrogenation catalysts are chromia-alumina, molybedna-alumina and molybdenum sulfide-alumina. Silica stabilized alumina is a particularly preferred supporting material for metal oxides and sulfides; catalysts containing silica-stabilized alumina as a supporting material for metal oxides and sulfides are readily regenerated to a high level of activity and, therefore, are particularly useful in commercial operation of the present process.

In carrying out the process of this invention, the reactants in vapor form are introduced into a reaction chamber which is maintained at desired reaction temperature and which preferably contains a solid contact catalyst. Of course, as has been indicated previously, the reaction zone may be entirely free of solid contact material.

It is evident that if a catalyst is employed in the vapor phase pyrolysis of aliphatic-substituted trithianes, the process may be effected in accordance with any of the usual techniques for high temperature catalytic conversions. Thus, fixed catalyst beds may be used in alternate reaction and regeneration cycles; fluid catalyst operation may be used wherein catalyst is continuously withdrawn from a reaction zone, regenerated and reintroduced into the reaction zone after regeneration; fluidized fixed bed operation may also be employed wherein the catalyst particles remain in the reaction zone during alternate reaction and regeneration cycles; stirred catalyst beds as well as moving catalyst beds of the Thermofor type are other possible alternatives.

The pyrolysis reaction is effected at a temperature between 500 and 1500° F., preferred temperatures falling in the range of 750 to 1250° F. In general, if pyrolysis is effected catalytically temperatures in the lower portion of the specified range, that is between 700 and 1200° F. may be employed, whereas if the pyrolysis is effected non-catalytically, it is necessary to employ temperatures in the higher portion of the specified range, that is in the neighborhood of 1000 to 1400° F.

Although the reaction is not pressure-sensitive, it is advisable to employ atmospheric pressure, since the pyrolysis effects decomposition of the trithiane compound with an attendant volume increase. Subatmospheric and superatmospheric pressures up to about 100 p. s. i. g. may be employed for the production of aliphatic-substituted thiophenes by pyrolysis of trithiane compounds of prescribed composition.

The pyrolysis reaction of this invention is effected at contact times of 1 to 25 seconds and preferably at a contact time of 10 to 20 seconds. When catalytic pyrolysis is employed, the aliphatic-substituted thiophene compound can be fed to the pyrolysis reaction at a space velocity of 0.1 to 10 weights of trithiane compound per hour per weight of catalyst. The preferred space velocities for the catalytic pyrolysis are in the neighborhood of 1 to 5.

It is recognized that selection of the particular conditions of reaction depends upon the reactant and also on whether a catalytic or non-catalytic process is employed. The type of process technique will also affect the selection of the particular reaction conditions. The particular reaction conditions are best illustrated by reference to conditions employed in the pyrolysis of hexamethyltrithiane to form a mixture of 2,5- and 2,4-dimethylthiophene in the presence of a chromia-alumina catalyst; the hexamethyltrithiane is advantageously charged to the reaction zone containing a fixed bed of chromia-alumina catalyst at a space velocity within the range of 1 to 4 and is subjected to pyrolysis at a temperature between 800 and 900° F. at atmospheric pressure. The afore-described conditions are optimum for the catalytic pyrolysis of hexamethyltrithiane to a mixture of dialykylthiophenes in a single pass operation. Where a continuous recycle process is used, it may be desirable to modify these preferred conditions of reaction in order to obtain an optimum ultimate yield of the desired product.

If a catalyst is employed, the process period for optimum production of thiophenes or thiophene derivative will depend to some extent upon the charge stock and reaction conditions employed. It generally will be about two hours in duration. Periodic determination of the yield of thiophene compound will indicate practical periods of catalyst use without regeneration. When the yield of thiophene compound is found to fall off sharply, the catalyst may be regenerated by conventional methods such as treatment with air at a temperature of about 1000 F.

Thiophene compounds produced by the reaction may be recovered from the reaction products in accordance with conventional methods of recovery. For example, the reaction products containing unreacted charge stock, hydrogen, cracked products of the charge stock, and hydrogen sulfide may be passed through a caustic soda solution to dissolve the acid gases. If the caustic soda solution is maintained cold, the thiophene compound will condense as a supernatant layer. The thiophene layer can be drawn off therefrom and distilled. If the caustic soda solution is maintained hot, the thiophene compounds will steam distill from the caustic solution and can then be separated from the water layer of the condensate and purified by distillation.

The thiophene compounds may also be recovered in crude form by a simple condensation procedure which involves passing the products into a cool body of hydrocarbon oil, such as kerosene, in which the thiophene compounds will condense; thiophene compounds can later be recovered from the condensing oil by distillation.

The process of the invention may be further illustrated by the following specific examples:

Example I

Hexamethyltrithiane was charged to a vertical stainless steel pyrolysis tube of 1" I. D. which was packed with inert porcelain chips and heated to 1100° F. over approximately a 2 ft. section of its length. The upper portion of the pyrolysis tube to which hexamethyltrithiane is charged at the rate of 134 grams per hour serves as a preheater. After 48 minutes on stream, there was obtained 53 grams of liquid product which, after caustic treatment, was distilled to yield 30 grams of dimethylthiophene boiling in the range of 253 to 307° F.; the center cut of the distillation had a boiling point of 135 to 140° C., a refractive index $N_D^{20}$ of 1.5112 and a density of 0.985. Analysis of the center cut showed it contained 63.9 per cent carbon, 7.18 per cent hydrogen, and 28.2 per cent sulfur, as compared with calculated theoretical values of 64.3 per cent carbon, 7.14 per cent hydrogen and 28.6 per cent sulfur for dimethylthiophene. Infra-red analysis showed the sample to be a mixture of approximately equal amounts of 2,4- and 2,5-dimethylthiophenes. Furthur proof of the nature of the pyrolysis product was obtained by hydrogenation over a NiS–WS catalyst to yield a mixture of n-hexane and 2-methylpentane.

Example II

Hexamethyltrithiane at the rate of 257 grams per hour was charged to a reactor of the type described in Example I which contained 250 cc. of 4 mesh alumina as packing. After 45 minutes on stream at a temperature of 800° F., the liquid product was caustic washed to yield 88 grams of a neutral liquid product which on distillation gave 60 grams of a mixture of 2,4- and 2,5-dimethylthiophenes distilling between 275 and 330° F.

Example III

Hexamethyltrithiane at a charge rate of 252 grams per hour was charged to a reaction vessel of the type described in Example I which contained 500 cc. of 4 mesh silica-stabilized chromia-alumina comprising 10 per cent $Cr_2O_3$–5 per cent $SiO_2$ and 85 per cent $Al_2O_3$. After 45 minutes on stream at a reaction temperature of 800° F., there was obtained a liquid product which after caustic washing gave 50 grams of a neutral liquid. On distillation of this neutral liquid, there was obtained 40 grams of a mixture of 2,4- and 2,5-dimethylthiophenes distilling between 265 and 320° F.

Example IV

Trimethyltriethyltrithiane at the rate of 125 grams per hour was charged to a reaction vessel of the type described in Example I which contained inert porcelain chips. After two hours on stream at a reaction temperature of 1100 F., there was obtained a liquid product which on caustic washing gave 97 grams of a neutral liquid; distillation of the neutral liquid under vacuum gave 18 grams of a mixture of diethylthiophene and dimethyl-ethylthiophene which mixture distilled between 212 and 223° F. at 50 mm. Analysis of this fraction showed it to contain 69.0 per cent carbon, 8.57 per cent hydrogen and 22.2 per cent sulfur as compared with calculated theoretical values of 68.6 per cent carbon, 8.57 per cent hydrogen and 22.8 per cent sulfur for $C_8H_{12}S$, the empirical formula for both diethylthiophene and dimethyl-ethylthiophene.

Example V 4.8 grams of tribenzyltrithiane was charged to a 100 cc. 3 neck flask equipped with a simple condenser take-off and a thermometer. The flask and its contents were then heated to a temperature of about 530° F. for about one hour during which time approximately 0.5 gram of distillate was recovered. The residual liquid in the flask and the distillate were both subjected to infrared analysis; the components of the distillate were identified mainly as styrene and ethyl benzene, while analysis of the residue indicated that it contained a high concentration of 2,4-diphenylthiophene.

The foregoing examples illustrate the preparation of thiophene compounds by the pyrolysis of aliphatic trithianes. It will be recognized that a wide variety of catalyst reaction conditions and charge materials other than those prescribed in the examples can be employed in the process of the invention.

Obviously, many modifications and variations of the invention as hereinbefore set forth may be made without departing from the spirit and scope thereof, and therefore only such limitations should be imposed as are indicated in the appended claims.

I claim:

1. A process for preparing thiophene and substituted thiophenes which comprises pyrolyzing at a temperature of 500 to 1500° F. a substituted trithiane compound in which at least two of the carbon atoms contain an aliphatic radical selected from the group consisting of alkyl, alkenyl and aralkyl groups.

2. A process according to claim 1 in which each of the nuclear trithiane carbon atoms contains at least one aliphatic radical.

3. A process according to claim 1 in which each of the nuclear trithiane carbon atoms is fully substituted with aliphatic radicals.

4. A process for preparing thiophene and substituted thiophenes which comprises pyrolyzing at a temperature of 500 to 1500° F. in the presence of a solid contact catalyst a substituted trithiane compound in which at least two of the carbon atoms contain an aliphatic radical selected from the group consisting of alkyl, alkenyl and aralkyl groups.

5. A process according to claim 4 in which the solid contact catalyst is an acid-reacting material of the group consisting of metal oxides and sulfides and mixtures thereof which are stable under reaction conditions.

6. A process according to claim 4 in which the catalyst is a group 6 metal oxide on a surface-active material.

7. A process according to claim 4 in which a catalyst is a group 6 metal sulfide on a surface-active material.

8. A process according to claim 4 in which each of the nuclear carbon atoms of the trithiane compound contains at least one aliphatic radical.

9. A process according to claim 4 in which each of the nuclear carbon atoms of the trithiane compound is fully substituted with aliphatic radicals.

10. A process according to claim 4 in which hexamethyltrithiane is pyrolyzed to yield dimethylthiophene.

11. A process according to claim 4 in which tribenzyltrithiane is pyrolyzed to yield diphenylthiophene.

12. A process according to claim 4 in which the pyrolysis is effected at a temperature between 700 and 1200° F.

13. A process for preparing thiophene and substituted thiophenes which comprises non-catalytically pyrolyzing at a temperature of 500 to 1500° F. a substituted trithiane compound in which at least two of the carbon atoms contain an aliphatic radical selected from the group consisting of alkyl, alkenyl and aralkyl groups.

14. A process according to claim 13 in which the non-catalytic pyrolysis is effected at a temperature between 1000 and 1400° F.

15. A process according to claim 13 in which each of the nuclear carbon atoms of the trithiane compound contains at least one aliphatic radical.

16. A process according to claim 13 in which each of the nuclear carbon atoms of the trithiane compound is fully substituted with aliphatic radicals.

KENNETH L. KREUZ.

No references cited.